Dec. 8, 1953 W. F. GREEN 2,661,637
QUICK RETURN CAM FOLLOWER FOR MACHINE TOOLS
Filed April 5, 1950 3 Sheets-Sheet 2
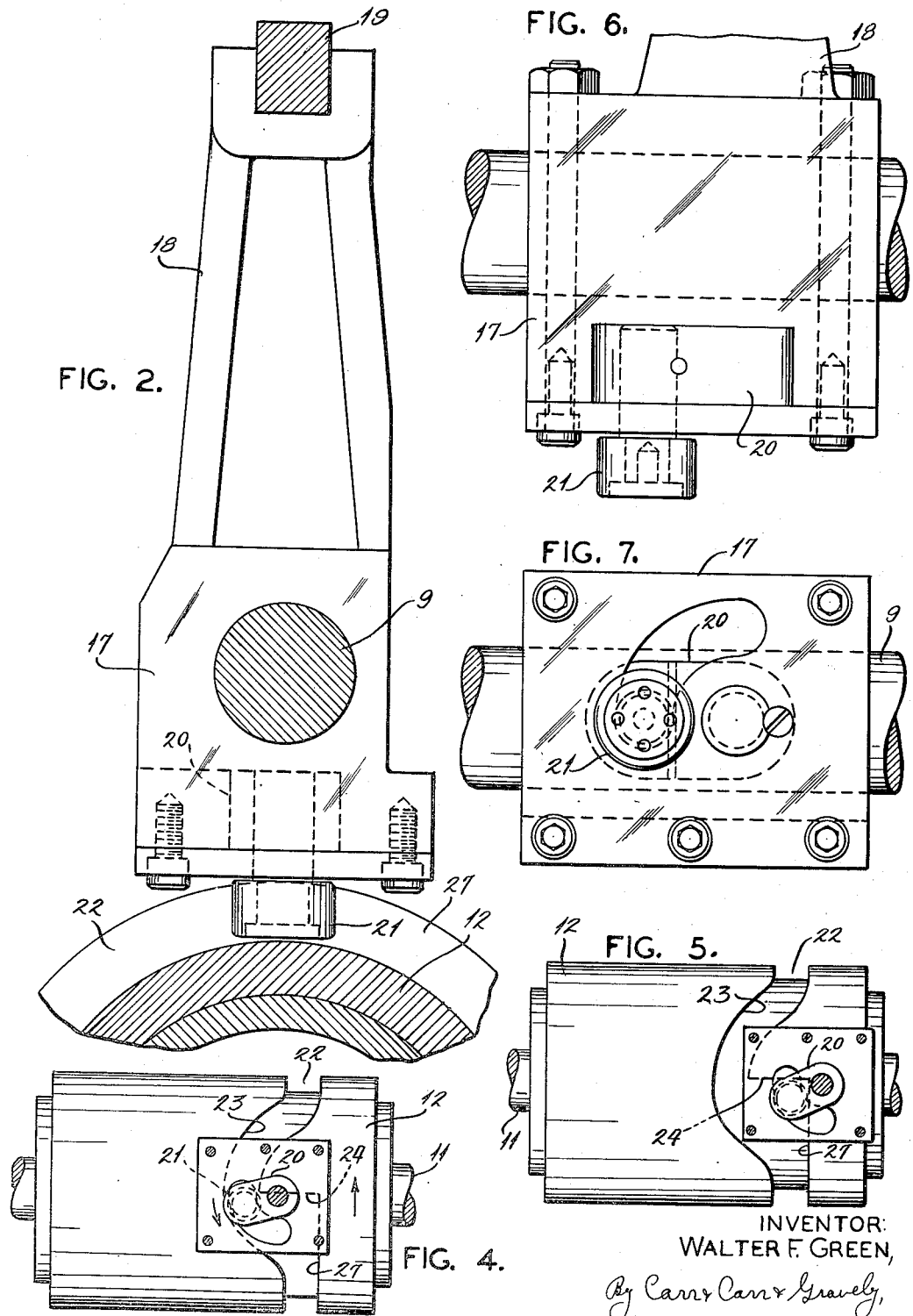
INVENTOR:
WALTER F. GREEN,
By Carr & Carr & Gravely,
HIS ATTORNEYS.

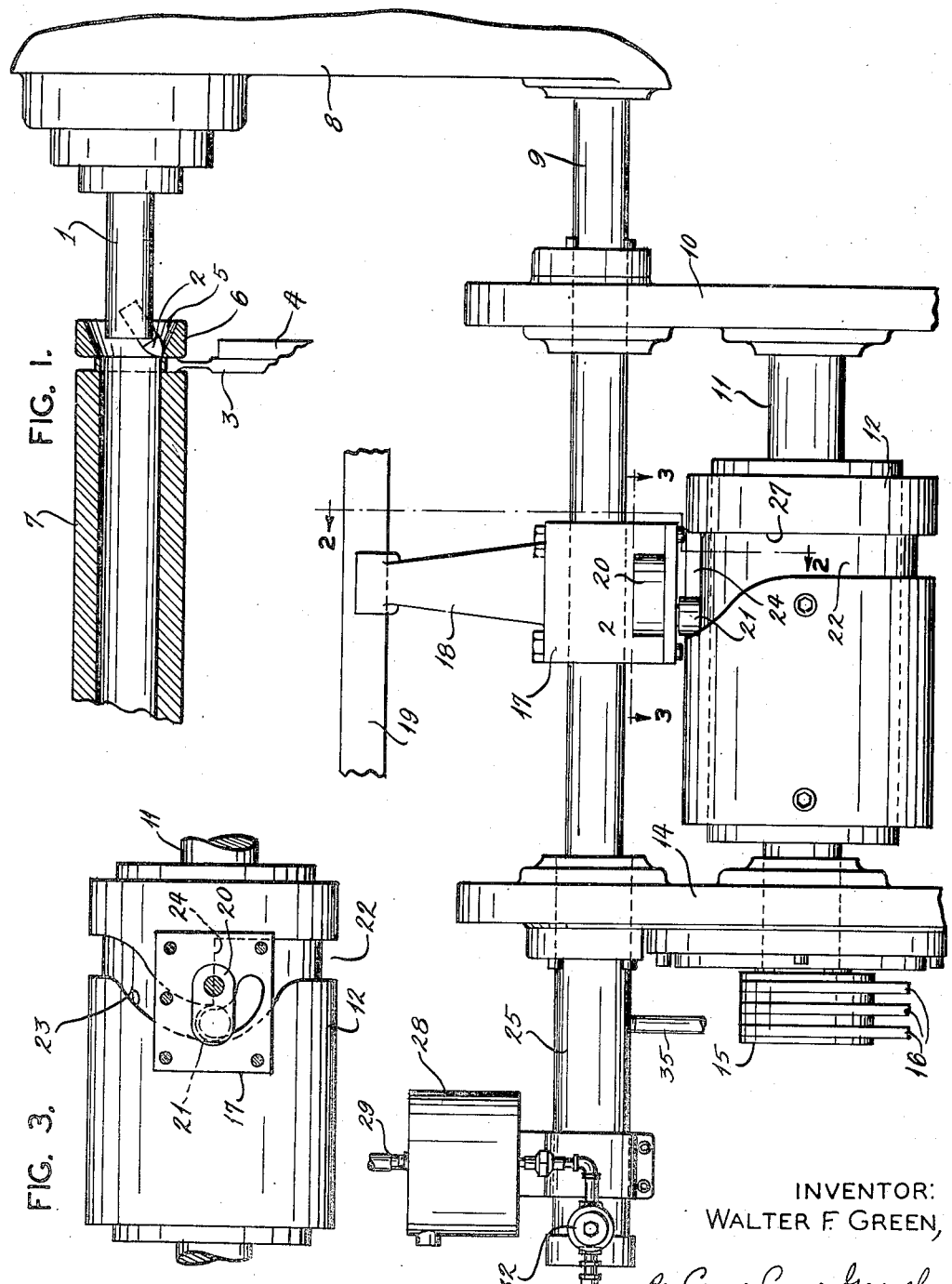

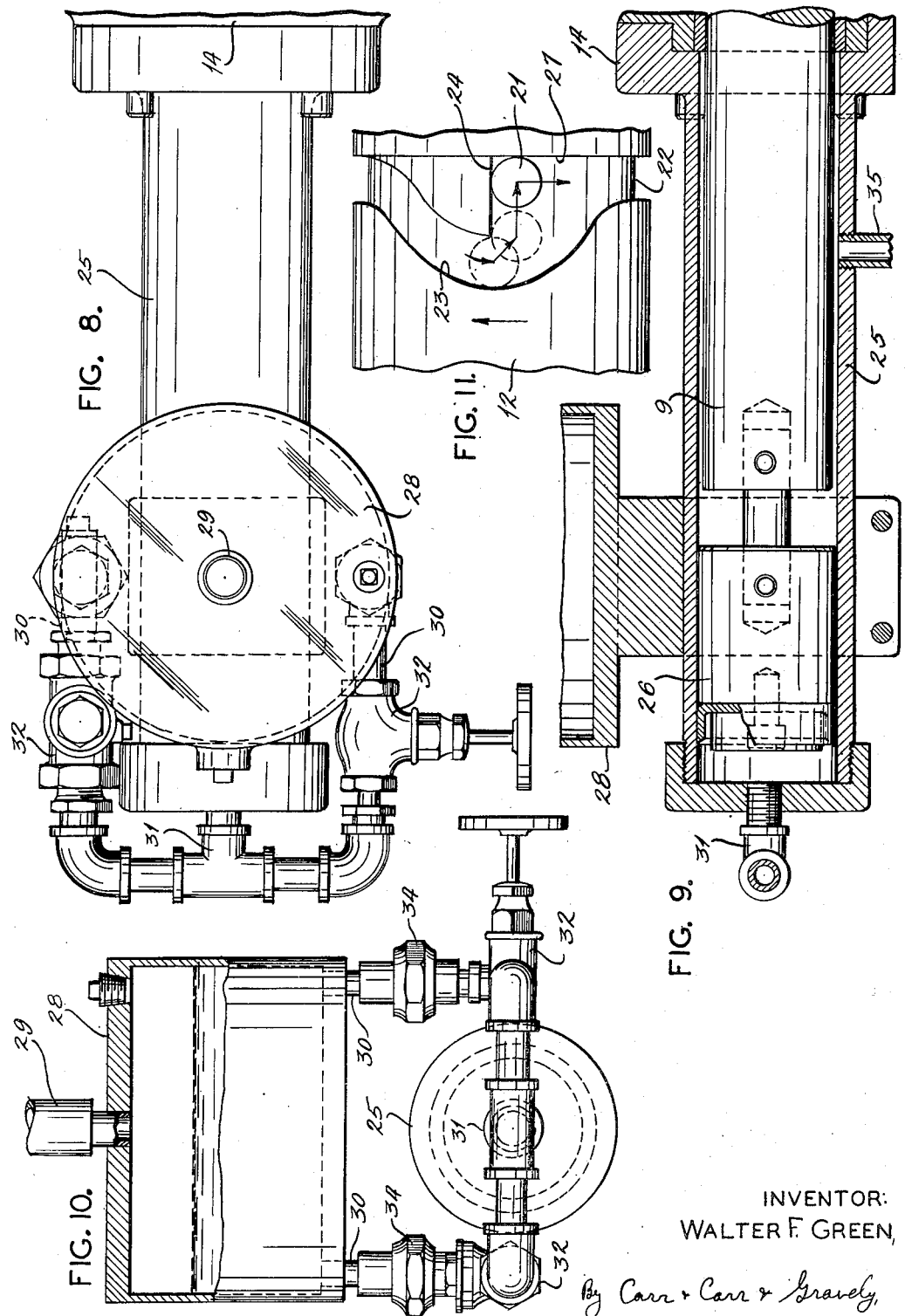

Patented Dec. 8, 1953

2,661,637

UNITED STATES PATENT OFFICE 2,661,637

QUICK RETURN CAM FOLLOWER FOR MACHINE TOOLS

Walter F. Green, Canton, Ohio, assignor to The Timken Roller Bearing Company, Canton, Ohio, a corporation of Ohio Application April 5, 1950, Serial No. 154,074

6 Claims. (Cl. 77—3)

This invention relates to machine tools and is more particularly directed to mechanism for quickly returning a cam actuated boring bar or tool slide to the initial position of an operating cycle.

The object of this invention is to provide mechanism for a machine tool that will increase the number of operating cycles per unit of time it operates without excessively stressing any one of the operating parts thereof.

The invention consists in the provision of a drum type cam for a reciprocable member of a machine tool that cooperates with a follower which is mounted on a swinging link, the cam having a track therein provided with an abrupt return section, thus permitting a fluid motor to quickly return the member to the starting position in the operating cycle, the rotation of the cam moving the member that forces the link to swing through an arc, placing the follower in its initial position for the next operating cycle.

In the drawings:

Fig. 1 is a plan view of a machine incorporating the invention with parts in section to show detail, Fig. 2 is a sectional view taken along the line 2—2 of Fig. 1, Fig. 3 is a sectional view taken along the line 3—3 of Fig. 1, Fig. 4 is a view similar to Fig. 3 showing the parts in a different position, Fig. 5 is a view similer to Fig. 3 with the parts in still a different position, Fig. 6 is a side elevational view of the swinging cam mechanism, Fig. 7 is a plan view of the swinging cam mechanism, Fig. 8 is a plan view of the boring bar return mechanism, Fig. 9 is a sectional view of the return mechanism illustrated in Fig. 8, Fig. 10 is an elevational view of the dashpot for the boring bar return mechanism; and Fig. 11 is a view showing movement of the cam follower relative to the cam.

Fig. 1 if the drawings illustrates the essential mechanism of a single spindle boring machine provided with a boring bar 1 on which is mounted a cutting tool 2. A cut-off tool 3 is secured to a suitable slide 4 actuated by conventional mechanism (not shown). The movement of boring bar 1 and slide 4 is so timed that taper 5 is completely cut in work piece 6 prior to the time the cut-off tool 3 severs the work piece 6 from the tubular stock 7. The boring bar 1 is suitably mounted in a slide 8 secured to the draw bar 9. The draw bar 9 is slidably received in a yoke 10 secured thereto and rotatably supporting shaft 11 on which a drum type cam 12 is mounted. This shaft is also rotatably mounted in a second yoke 14 in which the draw bar 9 is slidably received. A pulley 15 is fixed to shaft 11 and driven by belts 16 from a suitable power source.

The draw bar 9 is movable in yokes 10 and 14 and has mounted thereon a cam follower supporting member 17. An arm 18 is secured to member 17 and cooperates with a guide bar 19, the latter causing draw bar 9 to move in a straight line. A swinging link 20 is mounted in member 17 and a follower roller 21 is located in the cam track 22 cut in the drum cam 12. The cam track has a dip 23 therein, one side of the cam track being provided with an abrupt offset 24.

When the cutting tool 2 has reached the end of its movement toward the work piece, thereby completing the tapered cut in work piece 6, it must be quickly retracted in order to clear the cut-off tool 3. The accelerated movement of the cam follower roller 21 returns it to a position in alignment with the cam track 22 at the base of the abrupt off-set 24, this movement being accomplished by a fluid motor 25 provided with a piston 26 to which the draw bar 9 is secured. Fluid pressure is provided by a suitable source (not shown) which is applicable to piston 26. When the cam follower roller 21 begins to move along the abrupt off-set 24, as shown in Fig. 11, the fluid pressure acting on piston 26 will rapidly move draw bar 9 until the follower is in engagement with wall 27 of cam track 22. The motion of piston 26 is regulated by the dashpot 28 mounted on the fluid motor 25. The dashpot is connected to an incoming line 29 which provides static air pressure thereon. The outlet conduits 30 of dashpot 28 are connected to the fluid motor 25 through a fitting 31 leading into the interior of the fluid motor so that pressure fluid may act on piston 26. Each outlet conduit 30 has a union 34 therein and the diameter of one conduit is greater than that of the other. Each of the conduits 30 is provided with a valve 32 for controlling the flow of fluid in these conduits. Upon the return stroke of draw bar 9, the fluid within motor 25 is forced into dashpot 28 in preparation for the next cycle of operation. The portion of the motor 25 between piston 26 and yoke 14 is vented to atmosphere through a tube 35.

After a work piece 6 has been severed from the tubular stock 7, the draw bar 9 is returned to its starting position and the cut-off tool 3 is also returned to its starting position. The tubular stock 7 is then advanced a sufficient distance so that the cam 12 will advance the cutting tool 2 toward the work piece 6 for severing the tapered surface 5. At a predetermined time after initiation of the movement in draw bar 9, the cut-off tool 3 advances toward the work piece. When the cam follower roller 21 reaches a position opposite the abrupt offset 24, the fluid motor 25 initiates the return movement of the draw bar. The swinging link 25 causes the cam follower roller 21 to clear the offset so that the draw bar 9 may be quickly returned. The swinging link 20, on which the cam follower roller 21 is mounted, in combination with the abrupt off-set 24 and the external force applied to draw bar 9 by the fluid motor 25, accomplishes a swinging motion in the link, thereby making it possible to reduce the time for a complete operating cycle. The dashpot 28 and the particular conduits 30 selected, regulate the rate of return movement so that shock to the machine is prevented when piston 26 reaches the end of its return stroke. The fluid motor 25, which accomplishes the quick return motion, may be replaced by a spring having suitable characteristics or weights and if this is used, the dashpot 28 is also employed for controlling the motion of the draw bar 9 during the return movement.

What I claim is:

1. A machine tool comprising a boring bar having a cutting tool thereon, drum cam means having a cam track therein for moving said boring bar toward a work piece from a starting position, means on said cam means for permitting a quick return of said boring bar, a cam follower mechanism on the boring bar including a link swingable about an axis disposed at right angles to the rotational axis of said cam means and a roller rotatably mounted on said link and operable in said cam track; and fluid motor means for quickly moving said bar away from the work piece, said cam follower swinging in said means for enabling the bar to be quickly returned to its starting position.

2. A machine tool comprising a bar to which a cutting tool is applied, a draw bar for moving said first mentioned bar, a rotatable drum cam having a cam track therein, a cam follower mechanism on the boring bar including a link swingable about an axis disposed at right angles to the rotational axis of said rotatable cam and a roller rotatably mounted on said link and operable in said cam track; means in said cam for permitting said cam follower mechanism to be quickly moved; and a fluid pressure motor for rapidly moving the bar and cutter away from the work piece when the cam follower mechanism link and roller are swinging through said means formed in said cam.

3. A machine tool comprising a movable bar, a cutter secured to said bar for engagement with a work piece, means for moving said bar toward the work piece including a rotatable cam having a cam track therein and follower mechanism for the rotatable cam mounted on said bar, said follower mechanism comprising a link swingable on an axis disposed at right angles to the rotational axis of said rotatable cam, means formed in said cam for permitting said follower to swing relative thereto; and a fluid motor for rapidly moving said bar away from the work piece while the cam follower link and roller is swinging in said means formed in said cam.

4. A machine tool comprising a slide, a boring bar in said slide, a cutter secured to said bar, a slide bar secured to said slide, a drum cam provided with a track having an abrupt offset therein, a swinging link secured to said slide bar, a cam follower including said link and engageable with the track in said cam for moving said boring bar from starting position toward a work piece, a fluid motor operable on said slide bar for quickly returning said boring bar to its starting position when said follower passes said offset, thereby causing said swinging link to clear said follower from said track; and means for regulating the rate of return movement of said slide bar.

5. A machine tool comprising a slide, a boring bar carried by said slide, a cutter tool secured to said boring bar, a draw bar secured to said slide, a drum cam provided with a track having an abrupt offset therein and adapted for moving said cutter into a work piece from the starting position, a swinging link secured to said draw bar, a cam follower roller secured to said link and operable in said track, a fluid motor operable in said slide bar for quickly returning it to starting position, said swinging link moving said follower roller into alignment with said track for the next feeding movement; and a dashpot operably associated with said fluid motor for regulating the return movement of said draw bar and cutter.

6. A machine tool comprising a tool slide having a cutter thereon, drum, cam means having a track therein for moving said slide toward a work piece from starting position, means on said cam for causing a quick return of the tool slide, a cam follower mechanism on the tool slide including a link swingably mounted on an axis disposed at right angles to the rotation axis of said cam means and a roller rotatably mounted on said link and operable in said track; and means for quickly moving said bar away from the work piece, the cam follower link and roller swinging in said means for permitting said slide to be quickly returned to its starting position.

WALTER F. GREEN.

References Cited in the file of this patent

UNITED STATES PATENTS

| Number | Name | Date |
|---|---|---|
| 1,951,093 | Johnston | Mar. 13, 1934 |
| 1,998,873 | Kingsbury | Apr. 23, 1935 |
| 2,286,457 | Boillat | June 16, 1942 |
| 2,567,735 | Scott | Sept. 11, 1951 |